United States Patent Office 3,162,985
Patented Dec. 29, 1964

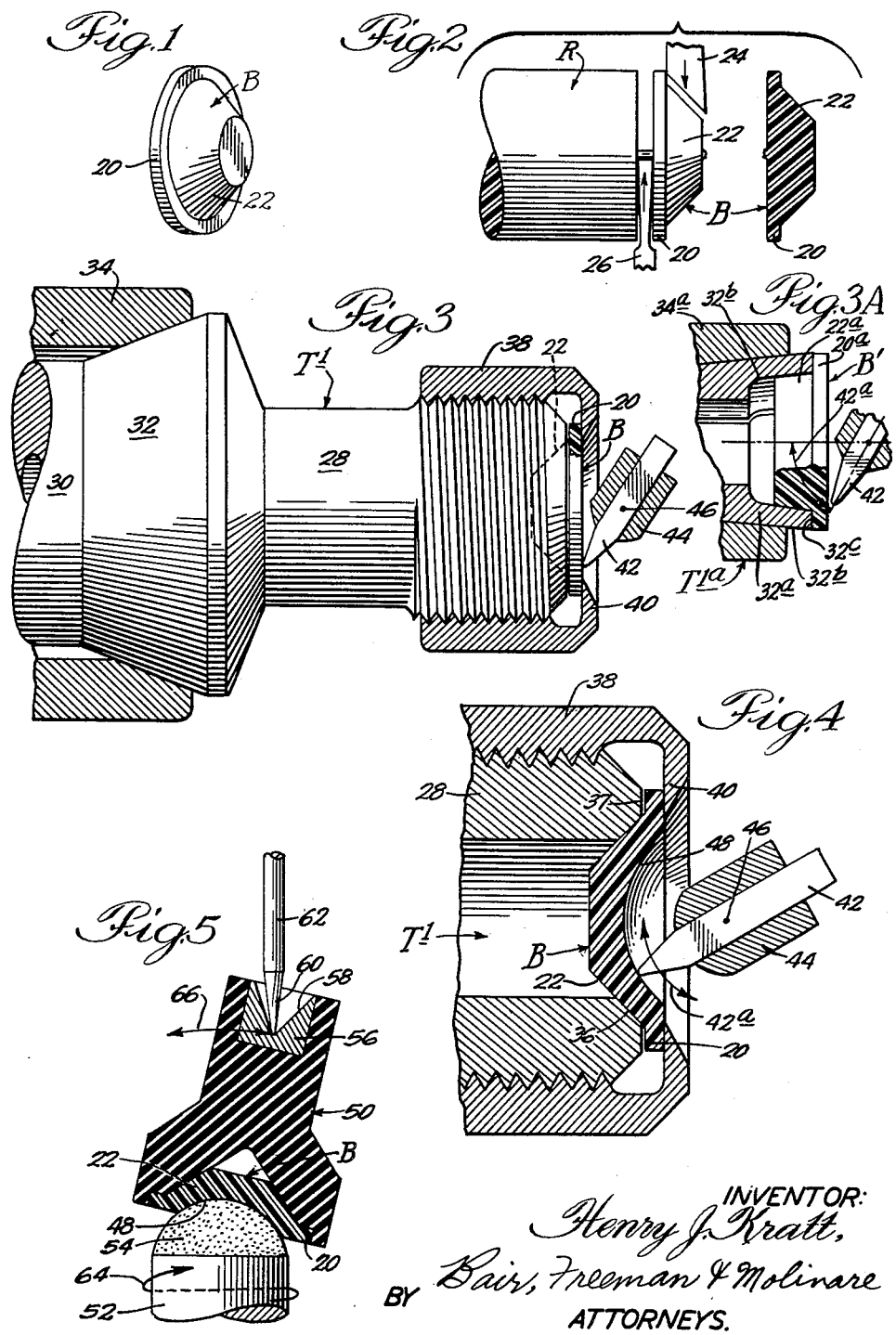

3,162,985
APPARATUS FOR PRODUCING CONTACT LENSES
Henry J. Kratt, Tulsa, Okla., assignor to The Plastic Contact Lens Company, Chicago, Ill., a corporation of Illinois
Original application Apr. 25, 1960, Ser. No. 24,473, now Patent No. 3,100,955, dated Aug. 20, 1963. Divided and this application Oct. 18, 1962, Ser. No. 231,476
4 Claims. (Cl. 51—217)

This invention relates to an apparatus for producing contact lenses.

One object of the invention is to provide apparatus that eliminates all possibility of prism in a contact lens produced by using my apparatus. The present application is a division of my copending application, Serial No. 24,473, filed April 25, 1960, now Patent No. 3,100,955.

Another object is to provide apparatus for producing contact lenses which maintains throughout the various operations from lens blank to near-finished lens an orientation flange around the lens, at least one surface of which provides a reference plane normal to the optical axis of the lens and cooperates with a plane surface of each of the various tools constituting my apparatus which are likewise normal to the axes of rotation of the tools, thereby insuring that both the base curve and the power curve of the lens will be properly related to the optical axis of the lens, both during cutting of these surfaces and during the polishing thereof.

A further object is to provide the first lens blank holding tool with a cone-shaped socket for a cone-shaped projection of a contact lens blank to seat against, a flange-engaging sleeve being telescopically movable on the tool and having a flange to engage the flange of the lens blank with the plane of engagement accurately normal to the plane of rotation of the tool, whereupon the base curve may be cut in the lens blank.

With these and other objects in view, my invention relates to the construction, arrangement and combination of the various parts of my apparatus for producing contact lenses, whereby the objects above contemplated are attained, as hereinafter more fully set forth, pointed out in my claims and illustrated in detail on the accompanying drawings, wherein:

FIG. 1 is an enlarged perspective view of a contact lens blank used with my apparatus for producing contact lenses;

FIG. 2 is a part plan, part sectional view of a lens blank being formed from a rod of methyl methacrylate or the like, and a cross section of the blank cut therefrom;

FIG. 3 is a part plan, part sectional view of a first lens blank holding tool for the lens blank and a cutting tool in position for cutting a base curve therein;

FIG. 3A is a similar view showing a modification;

FIG. 4 is a further enlarged sectional view of a portion of FIG. 3 showing the base curve being cut;

FIG. 5 is a vertical cross sectional view (same scale as FIGS. 1, 2 and 3) through a polishing holder and a lens blank after the base curve has been cut as in FIG. 4, together with polishing apparatus associated therewith, for polishing the base curve of the lens.

In FIG. 1, I show a typical lens blank B. As shown in FIG. 2 the lens blank B has an orientation flange 20 and a cone surface 22 which, as hereinafter will appear, are important elements of the blank. The blank itself thus comprises a truncated cone-shaped section with the flange 20 around the base of the section, and is shown and claimed per se in my copending application, Serial No. 48,126, filed August 8, 1960.

The blank B may be formed as in FIG. 2 from a rod R of suitable plastic material in a lathe by means of a cutting tool 24 and a parting tool 26. The cutting tool 24 forms one surface of the flange 20 and the cone surface 22 when moved in the direction of the arrow thereon while the rod R is being rotated by the spindle of the lathe, and the parting tool 26 when moved in the direction of the arrow thereon forms the other surface of the flange 20 and cuts the completed blank B from the rod in an obvious manner.

In FIG. 3 I show a first lens blank holding tool $T^1$ consisting of a stem 28 and a shank 30 having a cone portion 32 to fit in a lathe spindle 34. A sleeve 38 is removably threaded on the stem 28 and the stem has an internal cone surface 36 (see FIG. 4) of the same slant as the cone surface 22 of the blank B. The cone surfaces 22 and 36 are so related that when the blank B is in position as in FIGS. 3 and 4, a slight space is left between the end 37 of the stem 28 and the flange 20. Thus, I insure that the blank B when accurately formed will have seating engagement with the cone 36 only of the stem 28. The cone surface 36 is, of course, concentric to the axis of rotation of the first holding tool $T^1$ since it is formed on a lathe in the usual manner so that when the blank B is seated thereagainst, as in FIG. 4, the orientation flange 20 is normal to the axis of rotation of the tool, the blank, of course, likewise having its cone surface 22 concentric to the axis of rotation of the blank itself, because of lathe-forming as in FIG. 2. Opposite surfaces of the orientation flange 20 will also be accurately normal to the axis of rotation because the blank is formed by a lathe turning operation. Thus the right-hand surface of the flange 20 in FIG. 4 is normal to the axis of rotation of the holding tool $T^1$ whereupon the sleeve 38 may be tightened for holding it in position with assurance that this surface will remain normal to the axis of rotation because the inner surface of a flange 40 of the sleeve 38 is likewise normal to the axis of rotation of the sleeve itself due to its having been formed in a lathe.

The base curve 48 of the lens is now cut by a cutting tool 42 held in a tool holder 44 which swings, as indicated by the arrow 42a in FIG. 4, about a vertical axis 46 to cut the base curve. The distance from the axis 46 to the cutting point of the tool is, of course, exactly the same as the required radius for the base curve 48 which is varied in the usual manner as required to correspond to the prescription for the particular lens being produced.

In FIG. 3A a modification is shown, both of the lens blank and the tool $T^{1a}$ to hold it. The lens blank is indicated B' and has a flange $20^a$ similar to the flange 20 of FIG. 2 and a projecting boss $22^a$ suitable for holding in a split type draw-in collet $32^a$. The collet $32^a$ is drawn into the tapered bore of a lathe spindle $34^a$ in the usual manner so that the bore $32^b$ of the collet at the same taper as the portion $22^a$ of the lens blank B' contacts in effective diameter to securely hold the blank. The left-hand surface of the flange $20^a$ is pressed into contact with the end surface $32^c$ of the collet $32^a$ while drawing the collet tight. With this type of construction relatively larger diameter base curves can be cut into the blank B' without any interference as by the flange 40 of FIG. 3.

After the lens blank has the base curve 48 cut therein, the next step in the operation is to polish the base curve which is performed as illustrated in FIG. 5. The blank B, or B' as the case may be, is received in a lens blank holder 50 of rubber, neoprene or the like, so that it is frictionally held therein and the base curve is placed in contact with a polishing pad 54 on a polishing tool 52. The upper end of the holder 50 has an insert 56 provided with a cone seat 58 to receive the pointed end 60 of a vertical, reciprocably mounted pin 62. The pin 62 is usually weighted, or biased downwardly by spring pressure.

While the polishing tool 52 is rotated on a vertical axis as indicated by the arrow 64, the pin 62 is reciprocated horizontally as indicated by the arrow 66. During the polishing operation a polishing agent, such as a suspension of tannic oxide in water, is applied to the polishing pad 54 and after the desired polish for the base curve 48 has been secured, the lens blank is removed from the holder 50 and is ready to have the power curve cut thereon.

Some changes may be made with respect to the construction and arrangement of parts of my apparatus without departing from the real spirit and purpose of my invention. It is accordingly my intention to cover by my claims any modified forms of structure or use of mechanical equivalents which may reasonably be included within their scope.

I claim as my invention:

1. Apparatus for partially producing contact lenses comprising a lens blank holding tool having a cone seat for a lens blank that has a cone-shaped portion, and an inturned continuous flange normal to the axis of said tool and movable axially thereof to engage an orienting flange of the lens blank, said cone seat and said inturned continuous flange cooperating with said cone-shaped portion and said orienting flange respectively to hold the lens blank axis true to the axis of rotation of said tool while a spherical curve is formed on one side of the lens blank.

2. Apparatus for producing contact lenses comprising a lens blank holding tool having a cone seat for a lens blank that has a cone-shaped portion, means carried by said tool for effecting positive engagement between said cone-shaped portion and said cone seat, said cone seat cooperating with said cone-shaped portion and said means cooperating throughout a peripheral area with the lens blank to hold the lens blank axis true to the axis of rotation of said tool while a spherical curve is formed on one side of the lens blank.

3. Apparatus for producing contact lenses comprising a lens blank holding tool having a cone seat for a lens blank that has a cone-shaped portion and having a shoulder normal to the axis of rotation of said tool, said cone seat cooperating with said cone-shaped portion and said shoulder cooperating throughout a peripheral area with an orienting shoulder of said lens blank to hold the blank axis true to the axis of rotation of said tool while a spherical curve is formed on one side of the lens blank.

4. Apparatus for producing contact lenses comprising a lens blank holding rotor having a cone seat for a lens blank that has a cone-shaped portion, flange means normal to the axis of said rotor and movable axially thereof to engage an orienting flange of the lens blank, said means having a portion threaded on said rotor to effect axial movement of said flange means relative to said rotor, said cone seat and said flange means cooperating with said cone-shaped portion and said orienting flange respectively to hold the lens blank axis true to the axis of rotation of said rotor while a spherical curve is formed on one side of the lens blank.

References Cited in the file of this patent

UNITED STATES PATENTS

| 1,022,761 | Stvanek | Apr. 9, 1912 |
| 1,412,170 | Dixon | Apr. 11, 1922 |
| 1,455,438 | Hill | May 15, 1923 |
| 2,301,035 | Golderer | Nov. 3, 1942 |
| 2,443,895 | Day et al. | June 22, 1948 |
| 2,872,198 | Motz | Feb. 3, 1959 |
| 2,918,291 | Plantas | Dec. 22, 1959 |

FOREIGN PATENTS

| 601,326 | Great Britain | May 4, 1948 |